United States Patent [19]

Bronnec

[11] 4,285,653

[45] Aug. 25, 1981

[54] APPARATUS FOR FOLDING FOOD ARTICLES IN SHEET FORM

[75] Inventor: Jean A. L. Bronnec, Brest, France

[73] Assignee: Etablissements Generaux de Mecanique de l'Ouest, Brest, France

[21] Appl. No.: 52,328

[22] Filed: Jun. 26, 1979

[30] Foreign Application Priority Data

Jul. 4, 1978 [FR] France ............................... 78 19944

[51] Int. Cl.³ .............................................. A21C 11/00
[52] U.S. Cl. .................................. 425/324.1; 425/373; 425/384; 425/397
[58] Field of Search .............. 425/373, 397, 384, 324.1

[56] References Cited

U.S. PATENT DOCUMENTS

| | | | |
|---|---|---|---|
| 1,192,336 | 7/1916 | Mueller | 425/397 |
| 1,202,350 | 10/1916 | Baker | 425/397 |

*Primary Examiner*—James H. Derrington
*Attorney, Agent, or Firm*—Sandler & Greenblum

[57] ABSTRACT

A method of and apparatus for folding food articles in sheet form such as crepes, includes allowing a crepe to drop by gravity from the end of an upper conveyor on which the crepe is transported from a cooking apparatus, catching the crepe in a hollow casing configured to cause the crepe to fold over on itself along a line perpendicular to the direction of movement of the crepe on the conveyor, and passing the folded crepe, folded edge first, between the bite of a pair of vertically displaced, horizontally disposed feed rollers, whose axes are perpendicular to the direction of movement of the crepe on the conveyor, for feeding the folded crepe onto the upper surface of a lower conveyor. To facilitate the folding operation, the crepes traveling on the upper conveyor may be softened prior to the folding operation by passing the crepes through a humidifying tunnel.

16 Claims, 8 Drawing Figures

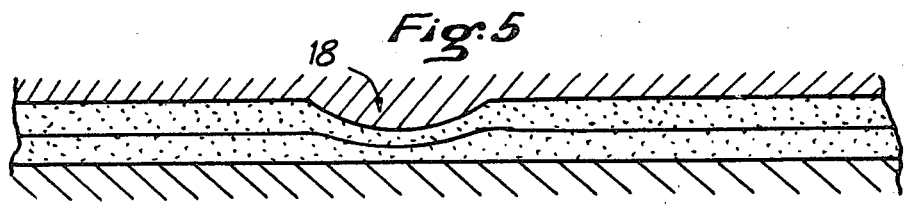
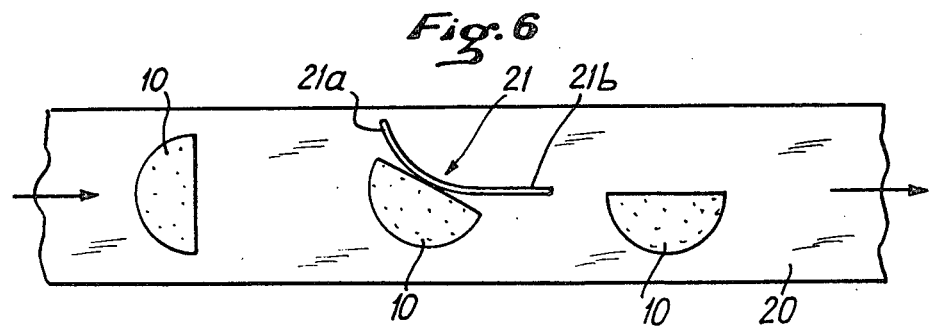
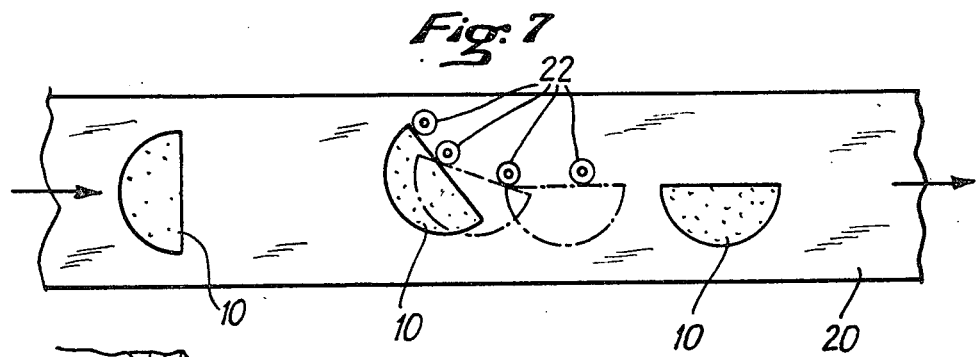
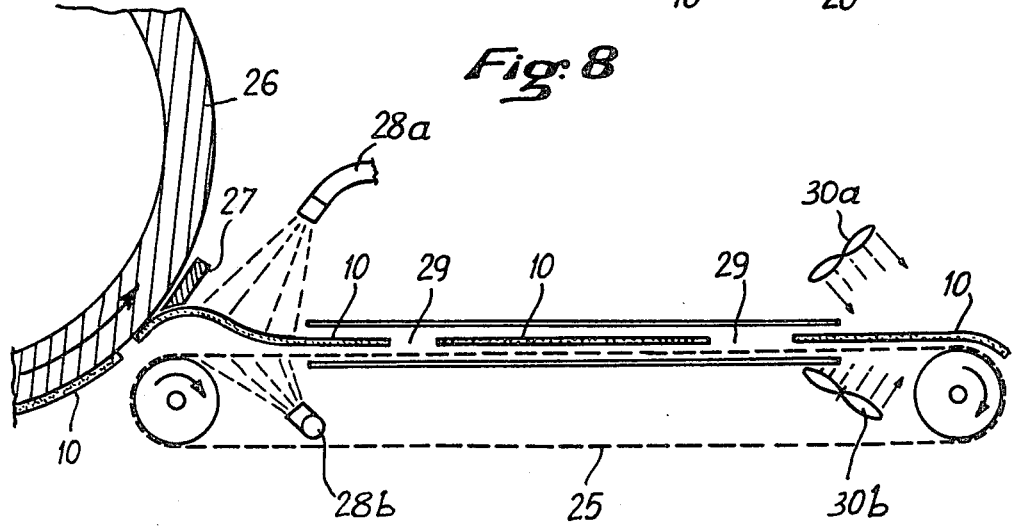

APPARATUS FOR FOLDING FOOD ARTICLES IN SHEET FORM

BACKGROUND OF THE INVENTION

1. Field of the Invention

This invention relates to a method of and means for folding food articles in sheet form, such as crepes, and also for folding nonedible articles.

2. Description of the Prior Art

Manufacturing procedures are constantly being improved to increase product ion yields. Unless subsequent shaping or other processing steps are also improved, it is necessary to provide a temporary storage at the discharge from a production machine. This requires manual recovery and distribution to a shaping apparatus thereby leading to increased costs.

That is the case in the food industry and particularly in the mass production of crepes. Existing devices for high-volume mechanically folding crepes are not satisfactory because folds are formed by "forcing" a crepe through a slot or between two rollers turning in opposite direction from each other, thereby subjecting the crepe to stresses that cause freshly cooked crepes to tear apart. To preclude this, it is necessary to allow the crepes to get somewhat stale after cooking thereby increasing their mechanical resistance. As a result, the crepes must be stored upon discharge from the cooking machine, with subsequent manual recovery and transport to folding apparatus.

The other known devices which are capable of treating crepes just after cooking are complicated and consequently are expensive. They include various electric control elements (microcontacts) and/or electronic control elements (presence detectors), and are not only often unreliable, but are undesirable because they limit the production by reason of the alternating or interrupted movements by which the elements are activated. Crepes can be folded along a line extending in the direction of displacement of the crepes on an evacuation conveyor placed at the discharge of a cooking machine, for example, by depositing the crepes astride a small diameter, rigid rod that is downwardly inclined in order to assure that the crepes will slide forwardly. Alternatively, the crepes can be deposited on an endless annular belt. But the formation of a fold perpendicular to the direction of displacement of the evacuation conveyor, which is very common in crepes, has always required the cooperation of two separate transmission elements, wherein the movement of one of them must be reversed at a precise moment. This reversal, an alternating movement of the corresponding element, considerably slows the flow of material by requiring the crepes to be widely spaced upon discharge from a cooking machine.

SUMMARY OF THE INVENTION

According to the present invention, apparatus for folding crepes comprises: an upper conveyor belt and a lower conveyor belt, each having upper surfaces for transporting crepes, the upper conveyor belt having an end drum; a hollow casing positioned below the end drum of the upper belt to catch a crepe as it drops by gravity from the end drum; the hollow casing being configured to cause a crepe, dropped from the end drum of the upper conveyor belt, to fold over on itself along a line perpendicular to the direction of its movement on the upper conveyor belt; and a pair of vertically displaced, horizontally disposed feed rollers whose axes are perpendicular to the direction of movement of a crepe on the upper conveyor belt, the feed rollers being adjacent the casing and positioned so that their bite receives the folded edge of a crepe for feeding the latter onto the upper surface of the lower conveyor belt. Advantageously, the casing is perforated to permit removal by gravity of scraps from the crepes that would otherwise collect in the casing; and the lower conveyor belt has an end drum which constitutes one of the feed rollers.

If the apparatus is used to accomplish the first fold of a crepe that is to be double-folded, the top roller of the pair of feed rollers advantageously may include a circumferential embossing member, preferably elastic, in its middle which increases the pressure on the middle of the crepe so as to form a score-line and prepare the crepe for the second fold.

If the apparatus is used to accomplish the second fold, a presser roller cooperating with the end drum of the first conveyor belt, can be provided to flatten and finish the first fold.

Thus the casing device of the present invention permits crepes to be folded along a line transverse to the direction of movement of the crepe. This fold can be the first fold; and in such a case a half moon casing is used for a circular crepe. When used to achieve the second fold of a cross folding, the casing has a quarter circle shape for use with a circular crepe. In the case of cross folding crepes, one of the folds can be obtained by the casing device of the present invention, and the other fold by another device. For example, the first fold can be realized by the casing and the bottom roller of the pair of feed rollers is provided with a guide notch in the middle for an annular belt which forms the second fold.

At any rate it is still possible to use a casing device to realize both of the folds of a cross folding, but as both of the folds are effected along a line transverse to the direction of displacement, it is necessary that between the formation of the first and the second folds the crepe must be rotated 90 degrees about the vertical.

In such case, the top surface of the conveyor belt would have a relatively low coefficient of friction with respect to the crepes carried thereon, and the apparatus includes means for rotating a crepe on such surface about a vertical axis. In one embodiment, the crepe is rotated by engagement with a continuous guide ramp closely overlying the top surface of the lower conveyor belt, the guide surface having a front portion positioned to eccentrically engage the folded edge of a crepe thereby rotating the same on the top surface of the conveyor belt, and a rear portion positioned to engage the rotated crepe and guide it to a final position that is rotated about 90 degrees from its position prior to engagement by the front portion of the guide ramp. In another embodiment of the invention, the crepe is rotated by engagement with a plurality of rollers rotatably mounted about vertical axes and positioned in overlying relationship to the upper surface of the lower conveyor belt for engagement by crepes carried thereon.

Whatever folding device is used, it is necessary to consider that crepes discharged from a continuous cooking machine become dry and brittle after several seconds. In order to fold the crepes, it is necessary to make them flexible by rehumidifying them, which generally is accomplished by water sprays, or a vapor emission, or the two combined, but this humidity does not penetrate instantaneously into the crepes. Consequently, they are "moistened" on the outside and dry in the middle, and thus remain fragile. So as to avoid the necessity of waiting for the moisture to permeate the crepes, which is prejudicial to production even if it is a very short period, it is necessary to hasten rehumidification in depth.

Analysis of the problem shows that while it is necessary to mitigate the drying of the crepes by application of water, it is also necessary, at the same time, to prevent their cooling upon discharge from the cooking apparatus in order to avoid hardening of the starch.

The invention also consists in the provision of a treatment station associated with the upper conveyor belt upstream of the end drum of the upper conveyor belt, the treatment station including means for softening the crepes before they reach the end drum. Preferably, the treatment station includes a tunnel through which at least the upper surface of the upper conveyor belt passes and means for spraying water on the crepes before they enter the tunnel wherein the crepes are steeped in a high humidity atmosphere. Preferably, the upper conveyor belt is lattice-like for exposing the lower surface of the crepes, and the top and bottom surfaces of the crepes are sprayed with water from nozzles located above and below the upper surface of the last mentioned belt. Hot water may be used to spray the crepes. Finally, the treatment station includes a blower located above and below the upper conveyor belt for blowing air on the crepes.

BRIEF DESCRIPTION OF THE DRAWING

Embodiments of the invention are disclosed in the following description and shown in the accompanying drawing wherein:

FIG. 5 is a cross section, on a larger scale, showing the action of the feed roller of FIG. 4;

FIG. 6 shows a top plan view of a one form of a rotation device to rotate an already folded crepe through 90 degrees;

FIG. 7 is a second form of a rotation device; and

FIG. 8 is a sectional view of a "core" rehumidification station at the discharge end of a crepe cooking apparatus.

DESCRIPTION OF THE PREFERRED EMBODIMENTS

Figure 1:
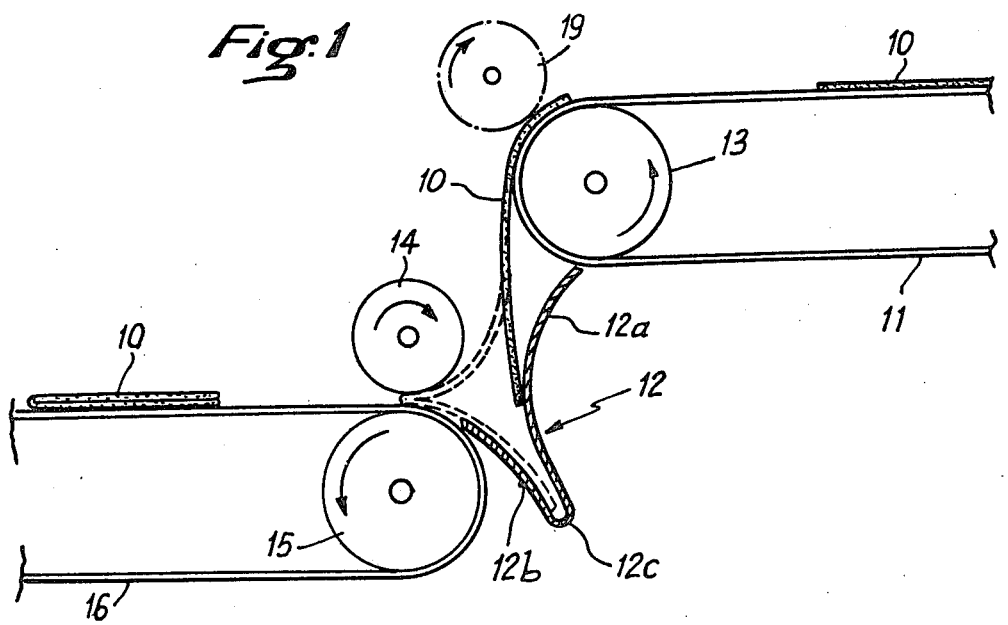
FIG. 1 is a side view of a crepe folding station according to the invention.
Figure 2:
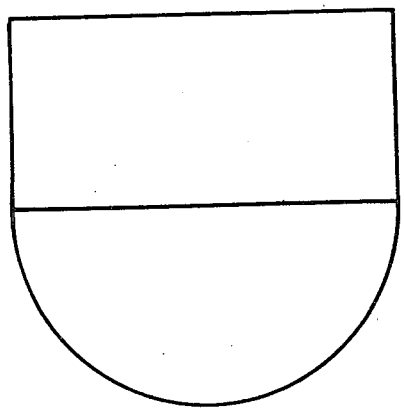
FIGS. 2 and 3 are front views of two types of hollow casings shown in FIG. 1, one for forming a "first fold" in a crepe and the other forming a "second fold" in a previouly folded crepe.
Figure 3:
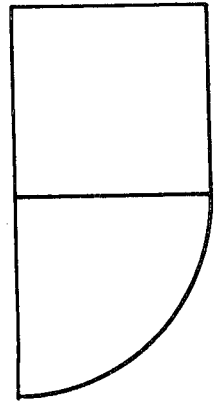

FIG. 1 is a folding device for folding crepes 10 along a line perpendicular to their direction of movement on the upper surface of upper endless conveyor belt 11. This device includes flat, hollow casing 12 shown in cross section. The casing is inclined forwardly in relation to the direction of advancement of the crepes, and its mouth, situated below the level of upper conveyor belt 11, is essentially in a vertical plane tangent to end drum 13 of the belt. The profile of casing 12 corresponds to the form desired for a crepe after it is folded. In other words, the profile is a half-moon (FIG. 2) for achieving the first fold of a circular crepe; and the profile is a quarter circle (FIG. 3) for achieving the second fold of a half-mmon crepe which will then be folded in four.

Casing 12 has a base 12c located below the upper surface of lower conveyor belt 16 and positioned to engage the lowermost end of a crepe as the latter drops from drum 13. Posterior wall 12a, connected to the base, extends beyond its profile and rises in a curve toward the rear terminating in the vicinity of drum 13. Anterior wall 12b of the casing is also connected to the base and is curved forwardly, its free edge terminating opposite the bite between two vertically displaced, horizontally disposed roller 14 and 15 whose axes are perpendicular to the direction of movement of a crepe on upper conveyor 11. These feed rolls rotate in opposite directions at the same tangential speed.

As a crepe 10 falls by gravity off drum 13 at the end of belt 11, it enters the mouth of casing 12. When the lower edge of the crepe strikes base 12c of said casing, the crepe, being flexible, collapses against anterior wall 12b and is folded back on itself under its own weight as suggested by the broken lines in FIG. 1. The folded edge of the crepe is then caught in the bite between feed rollers 14, 15 which extract it from the casing, flattening the fold, and depositing the crepe on the upper surface of conveyor 16. As shown in FIG. 1, bottom roller 15 can also constitute the end drum of lower conveyor belt 16 which transports the crepes from the folding station toward another shaping or processing station.

Advantageously, base 12c of the casing is perorated to permit scraps from the crepes to fall by gravity from the casing thus preventing clogging. If the crepes are to be folded in four, in crossed folded creases, the casing device which has just been described can be used to form both the first and second fold. On the other hand, another device can form the second fold parallel to the direction of movement of the conveyor.

Figure 4:
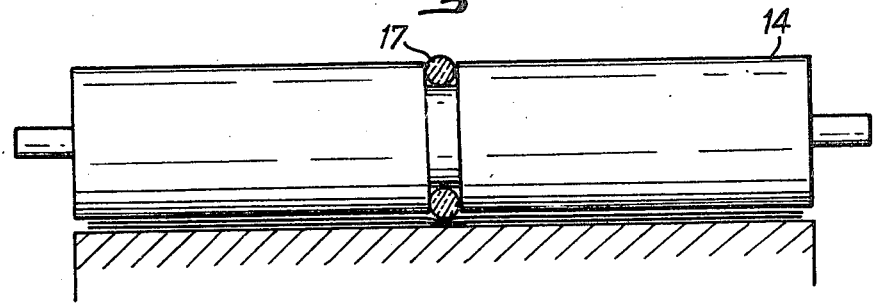
FIG. 4 is a side view of a feed roller of a folding station for forming a "first fold" and scoring the crepe for th next folding operation.

When the casing device forms the first fold of a crepe to be folded in four, it is advantageous to provide an elastic embossing in the middle part of the top feed roller 14, as shown in FIG. 4. It is for example constituted of an annular metal ring 17 which is lodged in a circumferential groove in the roller. Embossing or scoring a crepe in this manner increases the pressure on the middle part of the crepe and creates a line of weakness 18 by crushing the crepe along a line parallel to the direction of movement as shown in large scale in FIG. 5, thereby preparing the crepe for a second fold.

When the casing device is intended to form the second fold, it is desirable to provide presser roller 19, shown in chain lines in FIG. 1, which cooperates with drum 13 and finishes and flattens the first fold prior to formation of the second fold.

If a crepe is to be cross folded utilizing a casing device that forms the folds transverse to the direction of movement must be rotated about a vertical axis through an angle of folding stations. FIGS. 6 and 7 show two forms of suitable rotation devices according to the invention. Either of these rotation devices would be located between two folding devices. Crepes which are already folded once would be transported, folded edge turned frontward in the direction of movement on an endless belt 20 whose upper surface has a relatively low friction coefficient with respect to the crepes. Ramp 21 (FIG. 6) overlies and is slightly spaced from the belt on the order of several tenths of a millimeter. Front portion 21 of the ramp is positioned to eccentrically engage the folded edge of a crepe so as to cause the crepe to pivot on the conveyor belt. The middle portion of the ramp, and the rear portion, which is parallel to the direction of movement and is essentially aligned with the longitudinal axis of the conveyor, guide the crepe to a final position that is rotated 90 degrees as shown in FIG. 6.

Alternatively, the ramp can be in the form of a plurality of round rollers 22 as shown in FIG. 7. It is advantageous for these rollers to be in the form of spools which rotate freely around a vertical axis. The rotation of the crepe achieved with rollers 22 is the same as achieved with ramp 21. Two intermediate positions of a crepe between the beginning and the end of the rotation are shown in broken lines in FIG. 7.

Whatever folding device is used, it is often necessary to soften the crepes which tend to become dry and brittle as soon as they are discharged from the cooking apparatus. In the present invention, it is possible to act in two different ways, first by preventing total drying out from occurring, and second, by rehumidifying the crepes "to the core."

Apparatus for rehumidifying crepes is shown in FIG. 8. The crepes are received upon discharge from the cooking machine on an endless latticed belt 25. The crepes 10 are shown in FIG. 8 nearer together than they actually are, and at some distance above belt 25, while of course they actually rest thereon. In the cooking machine, the crepes adhered to a cooking drum 26 and are detached therefrom in a known manner, by a doctor blade or palette 27 so as to fall on belt 25 which, at its other end, carries them to a shaping station, for example a folding station as shown in FIG. 1. At the other end of the belt, in other words very near the cooking drum, the crepe is subjected, preferably on both of its surfaces, to a water spray, which can be hot water, from at least one top spray nozzle 28a and at least one bottom nozzle 28b. Nozzles 28a and 28b are located at the entry into a low tunnel 29 in which the crepes are steeped in an atmosphere which is saturated with humidity. To avoid subsequent introduction of vapor and thus of condensed droplets in the packets, the excess humidity can be cut by blowing fresh air on the two surface of the crepes, for example through aimed ventilators 30a and 30b, at the discharge from tunnel 29.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. Apparatus for folding crepes comprising:
   (a) an upper conveyor belt and a lower conveyor belt, each of said belts having upper surfaces for transporting crepes, the upper conveyor belt having an end drum;
   (b) a hollow casing positioned below the end drum of the upper belt to catch a crepe as it drops by gravity from the end drum, the hollow casing being configured to cause a crepe, dropped from the end drum of the upper conveyor belt to fold over on itself along a line perpendicular to the direction of its movement on the upper conveyor belt;
   (c) a pair of vertically displaced, horizontally disposed feed rollers whose axes are perpendicular to the direction of movement of a crepe on the upper conveyor belt, the feed rollers being adjacent to casing and positioned so that their bite receives the folded edge of a crepe for feeding said crepe onto the upper surface of the lower conveyor belt; said hollow casing having a base located below the upper surface of the lower conveyor belt and positioned to engage the lowermost end of said crepe as said crepe drops from the end drum of the upper conveyor belt, and an anterior wall connected to the base and extending forwardly towards the bite between said feed rollers.

2. The apparatus as defined by claim 1 wherein said hollow casing further comprises a posterior wall connected to the base and extending towards the end drum on the upper conveyor belt.

3. Apparatus according to claim 1 wherein the casing is perforated to permit removal by gravity of scraps from the crepes that would otherwise collect in the casing.

4. Apparatus according to claim 1 wherein the lower conveyor belt has an end drum which constitutes one of the feed rollers.

5. Apparatus according to claim 1 including means for cross-folding a crepe, the cross-fold line being in a direction parallel to the direction in which the lower conveyor moves.

6. Apparatus according to claim 5 including means for creating a fold-line in the crepe prior to cross-folding.

7. Apparatus according to claim 6 wherein the last named means includes an elastic, circumferential embossing member on one of the feed rollers thereby locally increasing the pressure on the central portion of a folded crepe passing through the feed rollers for forming the fold line.

8. Apparatus according to claim 1 wherein the top surface of the lower conveyor belt has a relatively low coefficient of friction with respect to the crepes carried thereon, and the apparatus includes means for rotating a crepe on such surface about a vertical axis.

9. Apparatus according to claim 8 wherein the means for rotating comprises a continuous guide ramp closely overlying the top surface of the lower conveyor belt, the guide surface having a front portion positioned to eccentrically engage the folded edge of a crepe thereby rotating the same on the top surface of the lower conveyor belt, and a rear portion positioned to engage the rotated crepe and guide it to a final position that is rotated 90 degrees from its position prior to engagement by the front portion of the guide ramp.

10. Apparatus according to claim 8 wherein the means for rotating comprises a plurality of rollers rotatably mounted about a vertical axis and positioned in overlying relationship to the upper surface of the lower conveyor belt for engagement by crepes carried thereon.

11. Apparatus according to claim 1 including a treatment station associated with the upper conveyor belt upstream of the end drum of the upper conveyor belt, said treatment station including means for softening the crepes before they reach the end drum.

12. Apparatus according to claim 11 wherein the treatment station includes a tunnel through which at least the upper surface of the upper conveyor belt passes and means for spraying water on the crepes before they enter the tunnel wherein the crepes are steeped in a high humidity atmosphere.

13. Apparatus according to claim 12 wherein the upper conveyor belt is lattice-like for exposing the lower surface of the crepes, and the means to spray the crepes include nozzles located above and below the upper surface of the last mentioned belt for spraying the top and bottom surfaces of crepes carried by such belt.

14. Apparatus according to claim 13 wherein hot water is used to spray the crepes.

15. Apparatus according to claim 13 wherein the treatment station includes blower means for cooling the crepes as they are discharged from the tunnel.

16. Apparatus according to claim 15 wherein the blower means includes a blower located above and below the upper surface of the upper conveyor belt.

* * * * *